United States Patent [19]

Miller et al.

[11] E Patent Number: Re. 33,384

[45] Reissued Date of Patent: Oct. 16, 1990

[54] NESTING BOX WITH REDUCED LID FLARES

[75] Inventors: Daniel R. Miller, Cincinnati; Thomas P. Deaton, Mason, both of Ohio

[73] Assignee: Buckhorn, Inc., Milford, Ohio

[21] Appl. No.: 398,774

[22] Filed: Aug. 25, 1989

Related U.S. Patent Documents

Reissue of:

[64] Patent No.: 4,688,675
Issued: Aug. 25, 1987
Appl. No.: 706,318
Filed: Feb. 27, 1985

[51] Int. Cl.[5] ..... B65D 21/02; B65D 21/06

[52] U.S. Cl. ..... 206/508; 206/515; 206/517; 206/518; 220/334

[58] Field of Search ..... 206/508, 509, 515, 517, 206/518; 220/334, 335, 337, 339

[56] References Cited

U.S. PATENT DOCUMENTS

| | | | |
|---|---|---|---|
| 2,112,451 | 3/1938 | Best . | |
| 2,803,369 | 8/1957 | Fleetwood . | |
| 3,351,229 | 11/1967 | Bridenstine | 206/517 |
| 3,383,009 | 5/1968 | Weikert . | |
| 3,463,345 | 8/1969 | Brocbenstette . | |
| 4,161,261 | 7/1979 | Frater . | |
| 4,325,492 | 4/1982 | Kurze | 220/335 |
| 4,349,108 | 9/1982 | Sharpe . | |
| 4,432,467 | 2/1984 | Swingley | 220/334 |

FOREIGN PATENT DOCUMENTS

| | | | |
|---|---|---|---|
| 1223247 | 5/1947 | United Kingdom | 220/339 |
| 2147567 | 5/1985 | United Kingdom | 206/515 |

*Primary Examiner*—George E. Lowrance
*Attorney, Agent, or Firm*—Fay, Sharpe, Beall, Fagan, Minnich & McKee

[57] ABSTRACT

In a plastic molded tote box having one lid or opposed lids that will shingle with other lids in the open position when the box and like boxes are nested, the maximum horizontal dimension for the shingled lids, as measured outwardly from the adjacent box side wall (lid flare), is reduced by tapering the lid rib structure toward the hinge, and/or by tapering the outboard lid skirt toward the hinge, and/or by flaring one or more lid flanges, particularly the inboard flange. The latter two structural features permit increased nesting of the lid side skirts or channels, which in the closed position of the lid overlie the box side walls.

55 Claims, 14 Drawing Sheets

NESTING BOX WITH REDUCED LID FLARES

Matter enclosed in heavy brackets [ ] appears in the original patent but forms no part of this reissue specification; matter printed in italics indicates the additions made by reissue.

BACKGROUND OF THE INVENTION

Tote boxes are general purpose containers, particularly for distribution of goods or their temporary storage. They are called upon to contain a wide variety of goods as they are shipped from a distribution point to a destination, for example, from a warehouse to retail outlets, from a manufacturer to a user, or within a manufacturing plant itself, for example.

The present invention relates to containers that may be nested within like containers so that their attached lids may shingle with the adjacent lids of the other containers, particularly for tote boxes and most particularly for tote boxes having two lids. The invention is particularly related to such boxes or containers that are molded, for example of a synthetic resin or plastic, so that the side and end walls are tapered towards the bottom to facilitate nesting of empty containers, wherein one or more lids are hinged respectively to the containers so that the lids may be swing generally 270° from their closed position to a position wherein they shingle with respect to each other when the containers are nested, and which lids have reinforcing ribs and/or one or more flanges on each side to overlap the adjacent side wall in the closed position.

Shipping or storage boxes, are of course designated to be shipped full and are transported in fixed transport volume areas, such as the inside of a truck wherein only a fixed number of such full containers may be placed. It has been found desirable to return the empty containers in a nested condition wherein a larger number of such containers may be returned within the same fixed transport volume. Such advantages are fully discussed and recognized in U.S. Pat. No. 4,349,108, issued Sept. 14, 1982. However, such is a well known old problem and solution. A further discussion of such return trip nesting is to be found in the patent to Fleetwood U.S. Pat. No. 2,803,369, issued Aug. 20, 1957 and Best et al U.S. Pat. No. 2,112,451 issued Mar. 29, 1938. The latter patent employs attached lids and an elaborate hinge structure so that the lids may lay flat against the sides of the boxes or be shingled when a plurality of boxes are nested to address the problem of lid flare, so that a considerable number of receptacles may be compactly nested with relatively little addition to the transverse dimension of the box.

Lid flare is designated as the increase in horizontal dimension, on one side of the box, as measured perpendicular to the attached lid hinge axis, as caused by nesting of a plurality of such boxes and corresponding shingling of their attached lids.

Lid flare has been a well known problem in the art with many attempts made at reducing it.

A comparison of FIGS. 2 and 3 of the Weickart U.S. Pat. No. 3,383,009, issued May 14, 1968 clearly shows the advantages of reduced height in nesting containers for the return trip, and also clearly shows the problems of lid flare in increasing the horizontal dimension by nesting with shingled attached lids.

A particularly advantageous tote box was developed by the assignee of the present invention, and involved two attached lids, with ribbing for increasing the rigidity of the lids and lid sides having a side skirt flange, preferably together with an inboard flange forming channel-shaped portions, for overlying the corresponding sides of the box in the closed position; Bockenstette, U.S. Pat. No. 3,463,345, issued Aug. 26, 1969. In FIG. 8, the lid on the left hand side is accurately shown, schematically, in full lines for the open position. The dotted line representation of another lid shows its relative position, but if it were actually present, it would force the solid line lid to flare outwardly, because of interference between the reinforcing ribs and the skirt/flanges/side channel. For this particular type of tote box, the free edges of the lids interengage in the closed position as shown in FIG. 1, due to the presence of one or more teeth on each lid. The assignee later found that increasing the depth (measured vertically in the closed position) of the ribbing for the lids not only increased the strength of the lids, but greatly facilitated such interengaging when the lids were closed, because it is necessary to close the lids together and the Bockenstette box many times hung up and required additional manipulation, whereas the additional ribbing provided for easy closure. The ribbing also makes it more difficult for a thief to insert a hand through the interengaging portions of the lids, the lids are otherwise secured to the side walls in the closed position by a rivet, e.g.

Although the increased ribbing is considerably older than the patent to Frater, U.S. Pat. No. 4,161,261, issued July 7, 1979, such increased ribbing is clearly seen in the Frater patent for this type of box. Also, this patent discloses the conventional manner in which the lids are secured to the box side wall at the sides, as shown in FIGS. 5 and 6, which may be employed for the present invention. This box will nest with like boxes so that their lids shingle, as mentioned above.

The present invention is applicable to all of the above boxes and others wherein there is lid flare.

SUMMARY OF THE INVENTION

It is an object of the present invention to reduce lid flare for nesting boxes that have attached lids.

More particularly, the invention relates to such boxes that are molded of synthetic plastic: which may also have ribbing on the lids to increase their strength and more particularly to facilitate closure when multiple lids are provided with interengaging surfaces for each box; and when the lid or lids for each box are provided with one or more flanges or a channel to overlap the side walls of the box, which increases the rigidity of the box with the lids closed and increases security.

When the empty boxes are nested so that their attached lids overlap or shingle, the lid flare caused by such shingling is reduced by the novel features of the present invention for various types of old and new boxes, by one or more of three structural features; (1) generally reducing the height or depth of the ribs or other projecting structure toward the hinges, (2) generally reducing the height or depth of one or more flanges on the lid sides, and (3) flaring one or more flanges on each side of the lid to facilitate flange or channel nesting in the shingled position. These features may be employed separately or together, and particularly when together they cooperate.

The present invention may be employed with tote boxes having one or more attached lids, with tote boxes of molded synthetic resin or other materials so that they are capable of nesting, and with other conventional features such as shown in the above-mentioned references.

BRIEF DESCRIPTION OF THE DRAWINGS

Further objects, features and advantages of the present invention will become more clear from the following detailed description of the drawing, wherein.

DETAILED DESCRIPTION

The importance of returning empty containers in a space saving manner has been known at least since 1938, the great effort and inventions have been directed thereto. What has been defined herein as lid flare has been a problem known and addressed for a long time.

In simple terms, the design of a container, such as the 1968 Bockenstette container may be described insofar as it relates to lid flare as follows. A tote box is designed for a particular customer who provides the input that their transport has a specific interior transport volume, which might be the height, length and width of the interior of a tractor trailer, and the customer will give a general statement of how big the box is to be. A customer always wants efficient return shipping the empty boxes so that the greatest number of empty boxes may be returned shipped without sacrificing other design criteria, which for plastic molded boxes with attached lids means that they are nested together when empty so that their attached lids will overly or shingle with respect to each other. The attached lid is a usual requirement to prevent loss of the lids and provide efficiency of handling. Therefore, the width, as measured horizontally perpendicular to the lid hinges, of nested boxes for the return trip is critical and lid flare has always been an undesirable increase in the width of nested boxes over full stacked boxes, which problem is a concern of the designer.

The present inventor has analyzed the lid flame problem and determined that lid flare is to a great extent caused by interference between the ribs, (particularly when they are large ribs having the above-mentioned advantages) and other analogous structure, or interference between adjacent flanges or channels made up of the flanges that overlap the side walls of the boxes when the lids are closed.

Figure 10:
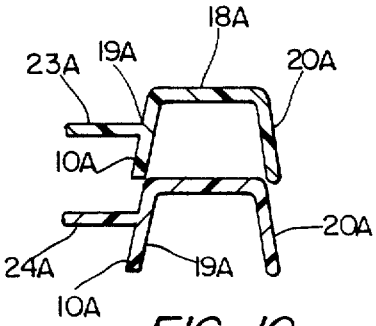
FIG. 10 is a partial cross-sectional view, similar to FIGS. 4–8, but of tote boxes not employing the features of the present invention.

For the side lid flanges, the most important flange is the outboard flange to vertically overlap the outside of the side wall, and an inboard flange may or may not be present. The flange is usually provided with a minimum flare, that is, a taper outwardly and downwardly when viewed from the closed position, for purposes of providing molding relief. Molding relief is the taper of an element to facilitate its removal from the mold. Such molding relief, even when exaggerated as shown in FIG. 10, is insufficient to provide for nesting of the side flanges or channels when the lids shingle, as will be explained more fully below. The inventor has analyzed this and determined that increasing of the flare for the inboard flange will provide nesting without any undesirable side effects, but that increasing the flare for the outboard flange would correspondingly increase the dimension of the tote boxes in the direction parallel to the hinges and reduced security, which would be considerable disadvantages. The present invention includes this analysis and the more particular solution of increasing the flare for only the inboard flange while tapering the outboard flange, in its depth, toward the hinge, which are respectively two of the three primary features of the present invention.

The inventor found also that while increasing the depth of the reinforcing ribs had desirable results, such ribs interfered when shingling to produce lid flare. By tapering the depth or height of the ribs toward the hinge, the interference was reduced or eliminated. This tapering of the ribs is the third of the three primary features of the present invention.

Tapering does not materially diminish the function of the flanges or ribs, because the need for such flanges and ribs increases proportionally to the distance from the hinges, as analyzed by the inventor.

These three primary features of the present invention will be better appreciated with reference to the drawings wherein old boxes and a new box design are illustrated with respect to lid flare when using old style ribbing and flanges, and compared with the same boxes employing the above-mentioned three features of the present invention to reduce lid flare.

Figure 1:
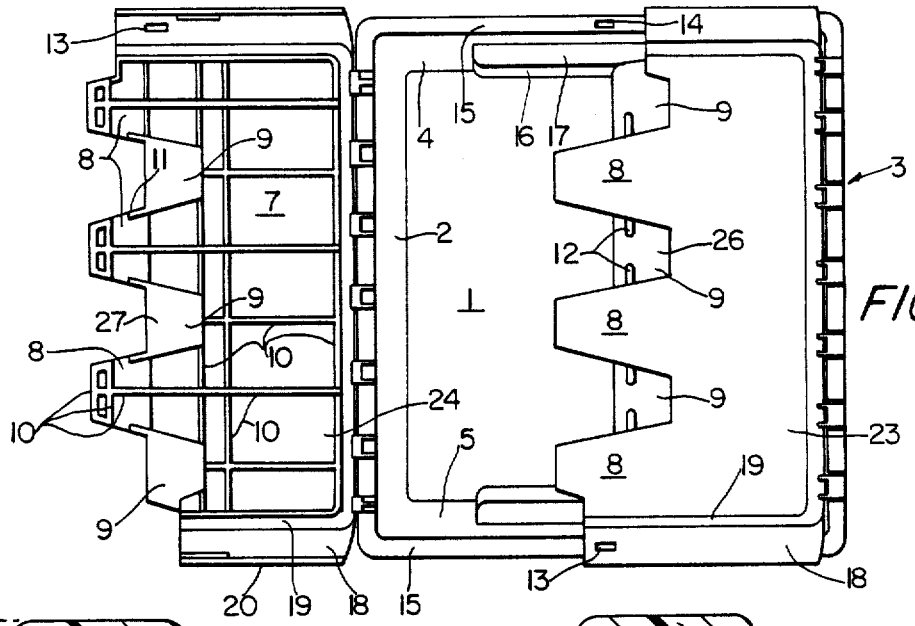
FIG. 1 is a top plan view of a tote box employing the features of the present invention, with one lid closed and the other lid opened and extending horizontally.

Although FIG. 1 illustrates a preferred embodiment to the present invention, the three primary features of the present invention are not readily viewable in FIG. 1. Although FIG. 1 is an illustration of a new design, it employs the following conventional features. A molded one piece container structure includes a bottom 1, opposed end walls 2, 3, which slope upwardly and outwardly from opposed end edges of the bottom 1, and opposed side walls 4, 5, which slope upwardly and outwardly from opposed side edges of the bottom 1. No particular significance should be placed on the terms side an end, except to distinguish them. The side walls and end walls are joined at their common corners to form an open topped box. Lids 6, 7 are respectively hinged to the top portion of the end walls 2, 3. These lids 6, 7 have raised portions 8 and depressed portions 9, (raised and depressed are terms relating the areas to each other and not other structure) which interengage as the lids 6, 7 are simultaneously moved into the closed position. As illustrated in FIG. 1, the lid 6 is in its closed position, while the lid 7 is in a transition position rotated 180° from its closed position, for purposes of illustration. From the position of the lid 7, the hinge is such that the lid 7 would be gravity fall to a depending vertical position, which open position would be approximately 270° rotation from the closed position of lid 6. Although portions 8 are referred to as raised, they are preferably at the same level as the central portion of the lid and overly the depressed areas of the adjacent lid, when both lids are closed. Thereby, the interengaging lids form a central planar landing surface to receive thereon the bottom of a like container, when full containers are stacked for transport or storage. To prevent the top stacked container from sliding off of the lower container, some abutment means are provided around the periphery of the landing area, which may constitute lugs (conventional such as in the Frater patent though not shown), or a flange structure leading to the recessed landing area as shown, or the like. With lugs, the landing area is preferably the same height as the tops of the side and end walls, although this is not necessary. The exact nature of the abutment means is not critical to the present invention, nor is the number of teeth or raised areas 8, nor are the details of the sides, bottom, lid or lids.

The lower side of each of the lids is provided with projecting structure, e.g. a plurality of ribs 10, of any suitable design or width. The term bottom or top of the lid is with respect to its normal closed position that is illustrated in FIG. 1 with respect to lid 6, the width of a rib or other projecting structure is with reference to such closed position and a horizontal measurement, whereas the depth of a rib or other projecting structure would be its vertical measurement or projection from the bottom surface 24, when in such closed position of the lid. The exact nature of the hinge used to hingedly secure the lid to the top edge of the end walls is not critically to the present invention, although it is necessary that the lids move through approximately 270° of rotation and preferably the hinges are such as to provide for a single axis of rotation for the lids, which is the most economical. Once both lids are in the closed position, (not illustrated), some type of hook is usually provided between the overlying raised and depressed areas to prevent them from spreading apart horizontally. Such hooks may be in the form of hooks depending from the raised areas and apertures through the depressed areas as in the above-mentioned Bockenstette patent, or openings, 11 in the side ribs of the raised areas that cooperate with upstanding lugs 12 of the depressed areas that will fit into such openings, or some other suitable structure. If desired, apertures 13, 14 may be respectively provided, in alignment, through the lid and upper horizontal flange 15 of the side walls so that a security tie (not shown and conventional) or rivet (not shown and conventional) may be passed through to provide for box security.

With respect to each of the side walls, they have a recessed central portion including a vertical wall portion 16 that is offset inwardly and a horizontal wall portion 17, which structure increases the strength of the side walls and further provides a hand hold.

The side of each lid includes a horizontal flange 18 that overlies and engages the corresponding horizontal flange 15 of the side wall, to provide support for the central portion of the lids when in their closed position. Although the lid central portions may be recessed below the flanges 15 or at the same level, as mentioned above, the present embodiment has the central portion recessed and connected to the horizontal flange 18 by an inboard vertical flange 19. An outboard vertical depending flange or skirt 20 is provided to overlap the outside of the side walls and to prevent someone from moving their hand between the lid and flange 15 when the lids are secured, as well as to prevent the lids from collapsing inwardly of the container when a load is placed in the center of the landing area when the lids are closed.

Except for the hand hold area 16, 17, the structure described above with respect to FIG. 1 is essentially conventional. For a further disclosure, reference is made to the above-mentioned Bockenstette and Frater patents, the disclosure of which is incorporated herein by reference.

Figure 14:
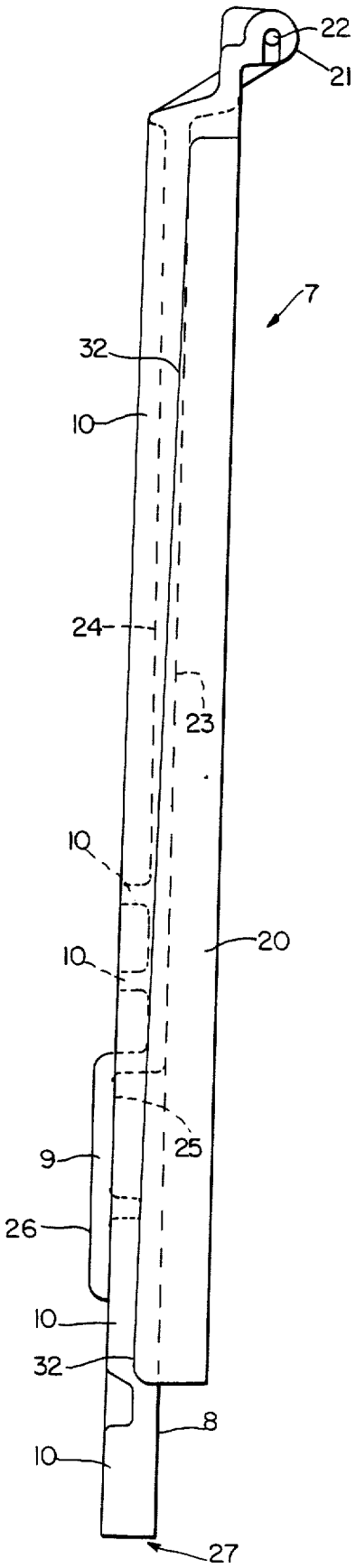
FIG. 14 is a side elevational view of a lid according to the present invention and the embodiment of FIG. 3.

FIG. 14 shows the lid 7 rotated 90° downward from its position in FIG. 1 and in a position that is 270°, approximately, of rotation from the position of lid 6 in FIG. 1. The hinge structure 21, having an axis of rotation 22, may be of any conventional type, for example as shown in the above-mentioned Bockenstette patent. The main portion of each lid is formed from a sheet of plastic having a generally uniform thickness, with a top surface 23 and bottom surface 24, with the top surface 23 forming the above-mentioned landing area and raised portions 8. The depressed area 9 has a top surface 26 and a bottom surface 27.

Figure 2A:
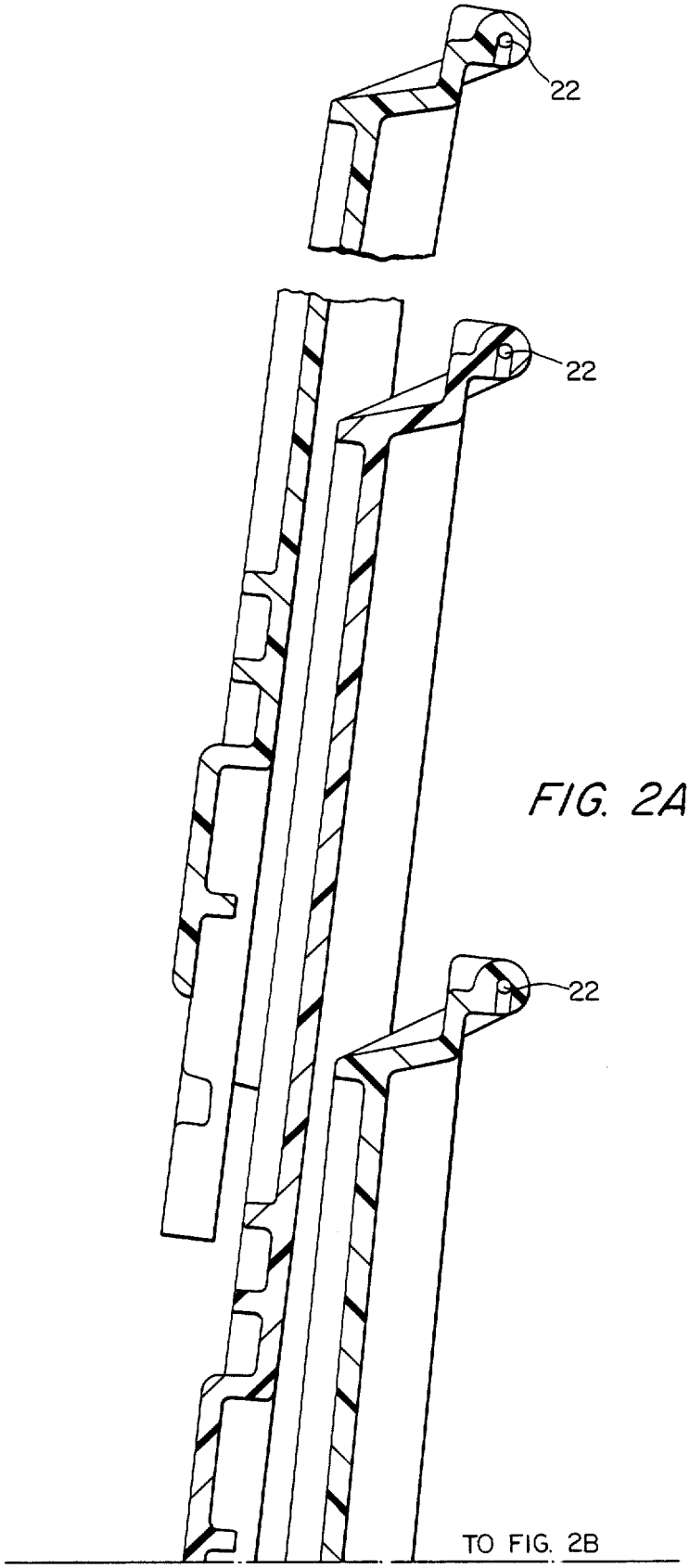
FIGS. 2A and 2B are together a partial cross-sectional view taken through a nested stack of like containers, with portions removed for clarity, and not employing any of the three main features of the present invention.
Figure 2B:
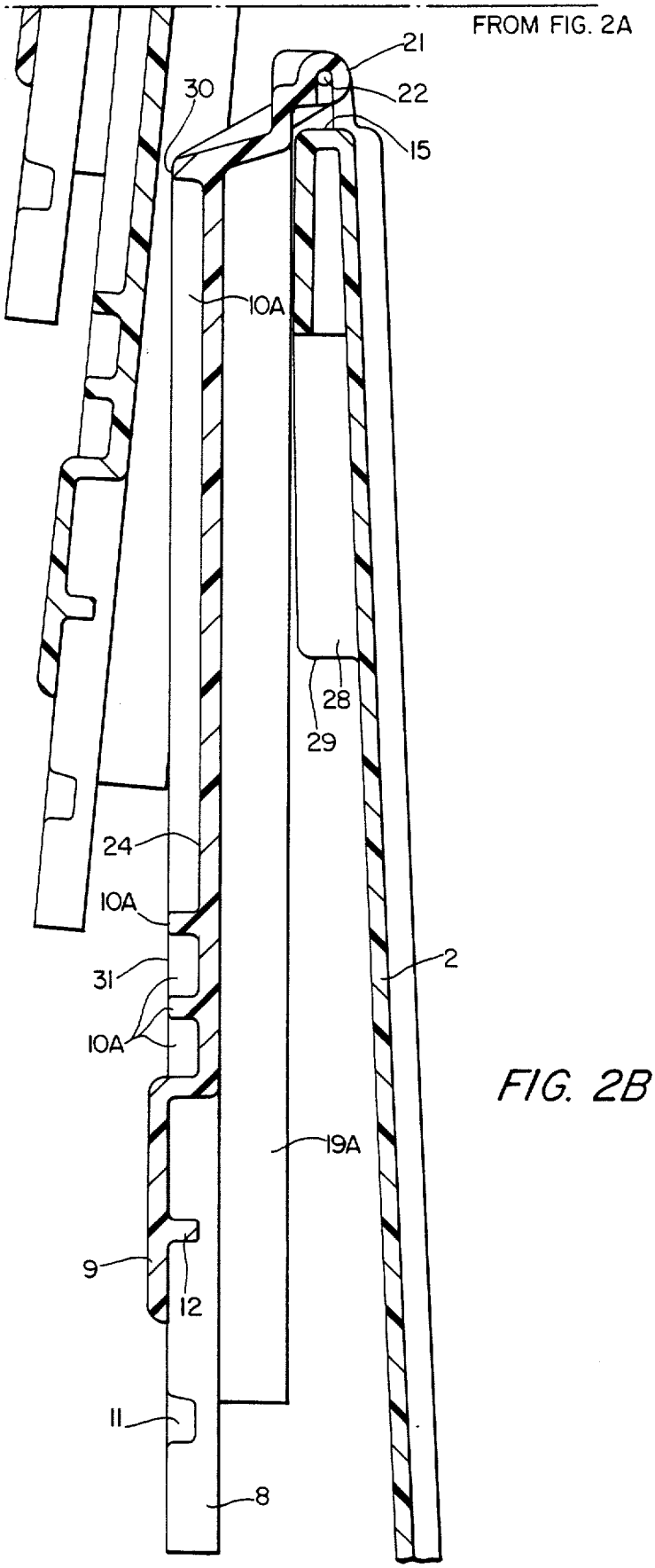
Figure 3A:
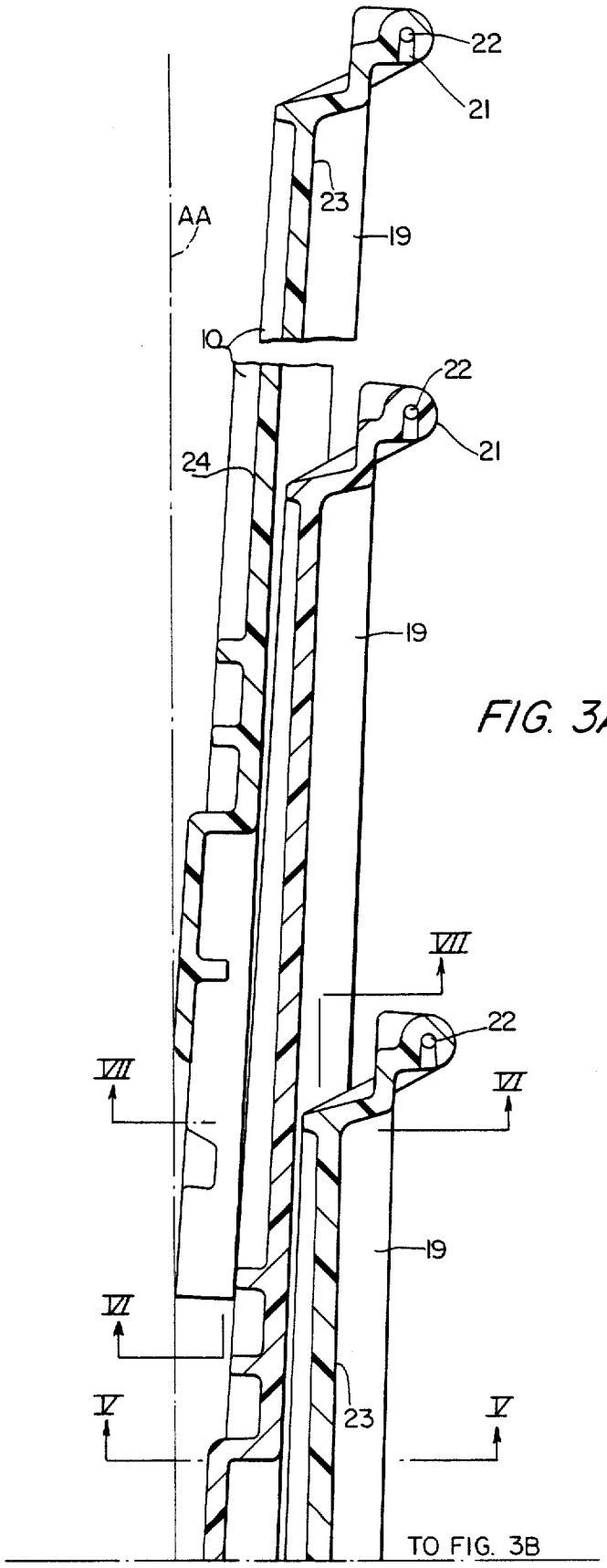
FIGS. 3A and 3B are together a cross-sectional view identical to FIG. 2, but employing the three main features of the present invention for a plurality of boxes as shown in FIG. 1.
Figure 3B:
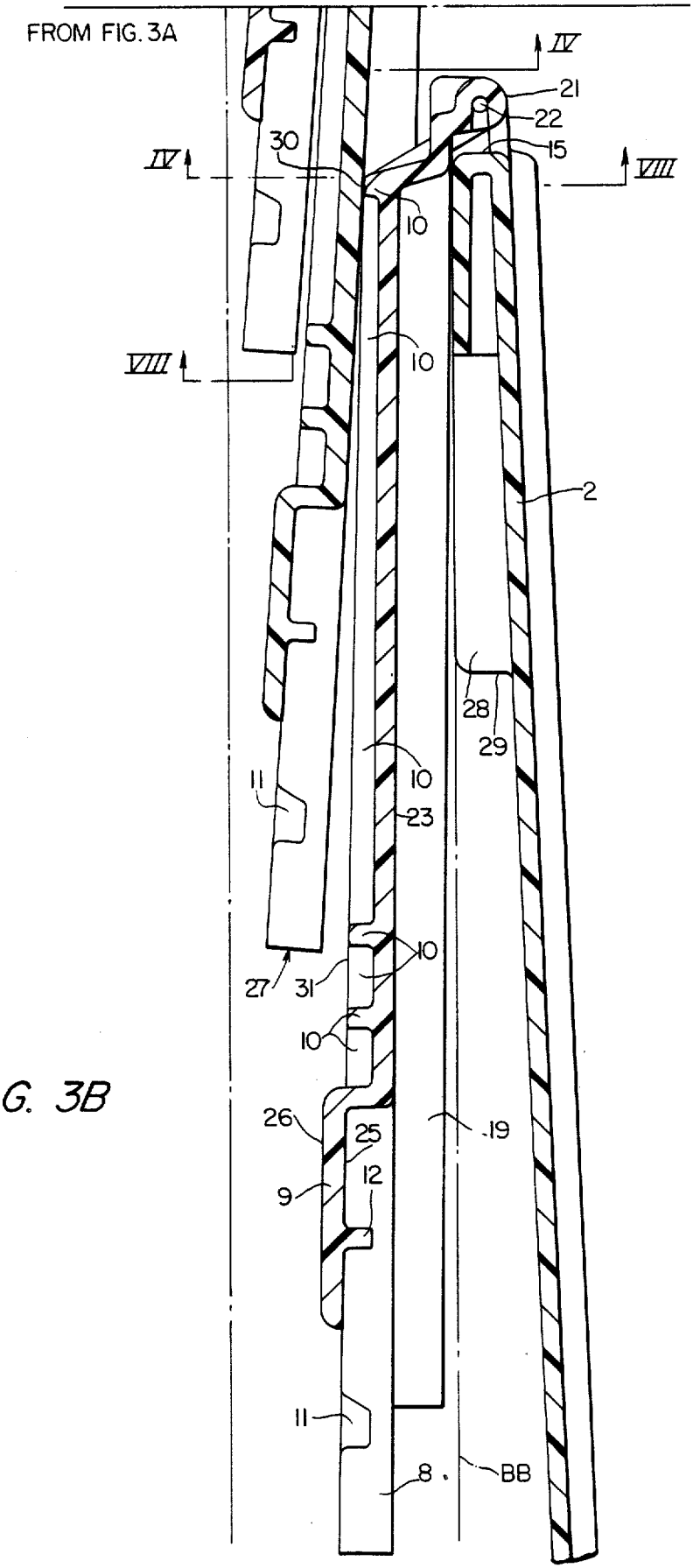

In general, the ribs 10 decrease in depth (as measured perpendicular to the landing area top surface 23) from the terminal end or interengaging end 27 of the lid to the hinge structure 21. These ribs may be continuous or discontinuous, step wise or continuously reducing in depth, or a mixture of the above, for example, that is the term taper is being used generally to mean that generally speaking the depth/height of projecting structure that would otherwise cause lid flare is reduced as it is closer to the hinge. The main point is that when the lids are shingled, in their open position with nested boxes, the top planar surface 23 of an upper box will lie adjacent the ribs 10 of a lower box, as seen, for example, in FIGS. 2 and 3. As seen in FIG. 3, the terminal end 27 of an upper box is at a height above the terminal end of the next lower lid, in the nested position. Therefore, the ribbing 10 may be of maximum desired depth below the terminal end 27 of the next highest box lid, because there is no possibility of the ribs engaging the next highest box lid below its terminal end 27, so that in such area, taper is not needed. Also, it is seen that the depressed area 9 extends out even further than the ribbing, but below the terminal end 27 of the next highest box. The extent to which the boxes nest, that is their nesting ratio, is determined by outwardly extending vertical ribs or buttresses 28 on the side walls of the boxes, which constitute nesting stops having a bottom edge 29 that will engage the flange 15 or other structure of the next lowest box in a stack, in a conventional manner. The point is that the ribbing and other structure of the lids that extends from the bottom surface 24 of the lids below the interfering structure of the next highest shingled lid is not critical in determining lid flare. The remaining overlapping portion of the bottom surface of the lid, that is between the terminal end 30 of the rib 10 closest to the hinge structure (a reference point) and the reference point 31 on the same lid structure that is adjacent the terminal end 27 of the next highest lid in the nest constitutes the overlapping area for the bottom surface 24. It is this area that is generally tapered, in depth, from point 31 to point 30, at least. In the actual preferred embodiment, the taper is uniform. The taper should be such that from reference point 30 to reference point 31, all ribbing and the like projecting structure on the bottom of the lid should be towards the inside of a plane passing through such points, with point 30 being at a depth materially less than the depth of point 31, as measured from the plane of the top surface 23 forming the landing area. This is one major feature of the present invention and will generally be referred to as rib taper, with taper being broadly defined as mentioned above and ribs generally referring to any structure within the overlap area between points 30 and 31 that extends downwardly from the bottom surface 24, that might affect lid flare. The significance of this feature will become more apparent from a discussion below.

The remaining two major features of the present invention relate to the flanges 19, 20 on the sides of the lids. First, however, a conventional lid structure will be discussed with respect to such flanges. In a conventional lid structure, the inboard flange 19A is preferably vertical or slightly flared for mold relief to provide a firm abutment to resist movement of the side walls inward and to resist lateral movement of a like box stacked upon the lid when in its closed position. Likewise, the outboard flange 20a is preferably vertical or with a slight mold relief so that it will securely engage the side wall to resist inward bowing of the top which a heavy weight, foot or the like is placed in the center of the landing area, for example. Further, it is desirable to have the outboard flange 20a as vertical as possible because any outward flare tends to increase the overall dimension of the box in the direction parallel to the hinge axis 22. Therefore, it is seen that even with the exaggerated flare shown in FIG. 10, with respect to the conventional structure, these flanges for adjacent lids in the shingled position will not nest, due to engagement between the edge of the outboard flange 20A and the flange 18A of the adjacent box lid, and/or the engagement between the lower edge of the flange 19A and the flange 18A of the adjacent box lid. The flange 18A is used loosely, to include, if present, the extension thereof in the form of a rib 10A. Such engagement, as well as the engagement of the ribs 10A with the top surface 23A of an adjacent lid (not shown), at other locations, have been found to be the engaging points for controlling the lid flare in a lid structure not employing the main features of the present invention, for example, as shown in FIG. 2.

A second feature of the present invention is that the inboard flanges 19(or the corresponding ribs in a nonrecessed top structure, for example as shown in the above-mentioned Frater patent) are downwardly and inwardly flared to a sufficient extent that they will nest within each other to an extent sufficient to provide the desired reduction in lid flare as compared to lid flare without such nesting of the inboard flanges. Such flaring is at an angle greater than conventional for mold relief, and sufficiently greater to provide the above-mentioned function. Since this flange is inboard, it in no way affects the exterior dimensions of the box. This flange will still satisfactorily limit lateral movement of a box stacked thereon, or may not even have such function if separate stacking lugs are provided such as in the above-mentioned Frater patent. Further, even a flared lid inboard flange will provide some support for the side walls against their deformation inward, although such as not a particularly big problem with respect to tote boxes, particularly when loaded. This second feature will be referred to as flange flare, which includes an equivalent rib flare or skirt flare (not shown), particularly with respect to the preferred embodiment of a recessed lid.

In a structure such as the above-mentioned Frater patent, the flange flare may not be required, or at least to a lesser extent. However, the stacking lugs, that is lugs that prevent lateral shifting of stacked boxes and function as the abutment means, should desirably be placed in the plurality of locations so that they will nest within stacking lugs of an adjacent box lid, for example the stacking lug closest to the end 27 of an upper lid may nest within the stacking lug that is second from the end 27 of the adjacent lower lid, in the nesting position. Thus the flanges of the lugs would be flared to nest. That is, a structure that may be added and that is not shown in the present embodiments would have the concepts of the present invention applied thereto to reduce lid flare, if they would otherwise cause lid flare.

The third major feature of the present invention relates to the outboard flange 20. The nesting of the inboard flange and/or moving of the shingled lids closer together according to the present invention to reduce lid flare is further permitted by a special structure for the outboard flange 20. Again, this is only critical in the overlap area between points 30 and 31, and the outboard flange may have a maximum and even uniform downward extent in the areas below point 31, for example in FIG. 3. In a manner similar to the ribs 10, this outboard flange 20 is tapered, in general, from at least the point 31 to the point 30 or toward the hinge structure 21. The tapering, as with the ribs, may be stepwise, continuous or discontinuous. In the preferred embodiment, as shown in FIG. 14, the lowermost edge 32 of the outboard flange 20 is tapered toward the top surface 23 from at least the point 31 to the point 30. With such a structure, the outboard flange 20 may be maintained as close to vertical as desired, for the above-mentioned advantages, while still reducing lid flare.

With respect to tapering of the outboard flange and tapering of the ribs, it is noticed that such tapering will reduce the strength of these elements proportionally towards the hinge structure 21. However, this is not a disadvantage, because the inventor has analyzed the box structure to the extent to realize that strength of these elements is more important proportionally to the distance from the hinge axis 22, for example it is near the terminal end 27 that the greatest strength for the outboard flange 20 is needed and where the greatest strength for the ribs is needed, whereas towards the hinge structure where the hinge and its adjacent end wall provides support for the lid, the strength of the ribs and outboard flange 20 are not so important. Therefore, the three main features of the present invention may be employed without sacrificing function of these elements or materially affecting the function, strength, security and the like of the box. In fact, there is some saving in weight and materials, which becomes significant with thousands of boxes having thousands of trips each.

As a specific example, of the preferred embodiment, the material used for construction may be prime high density polyethylene, which is injection molded with a wall thickness of 0.14 inches.

Figure 12A:
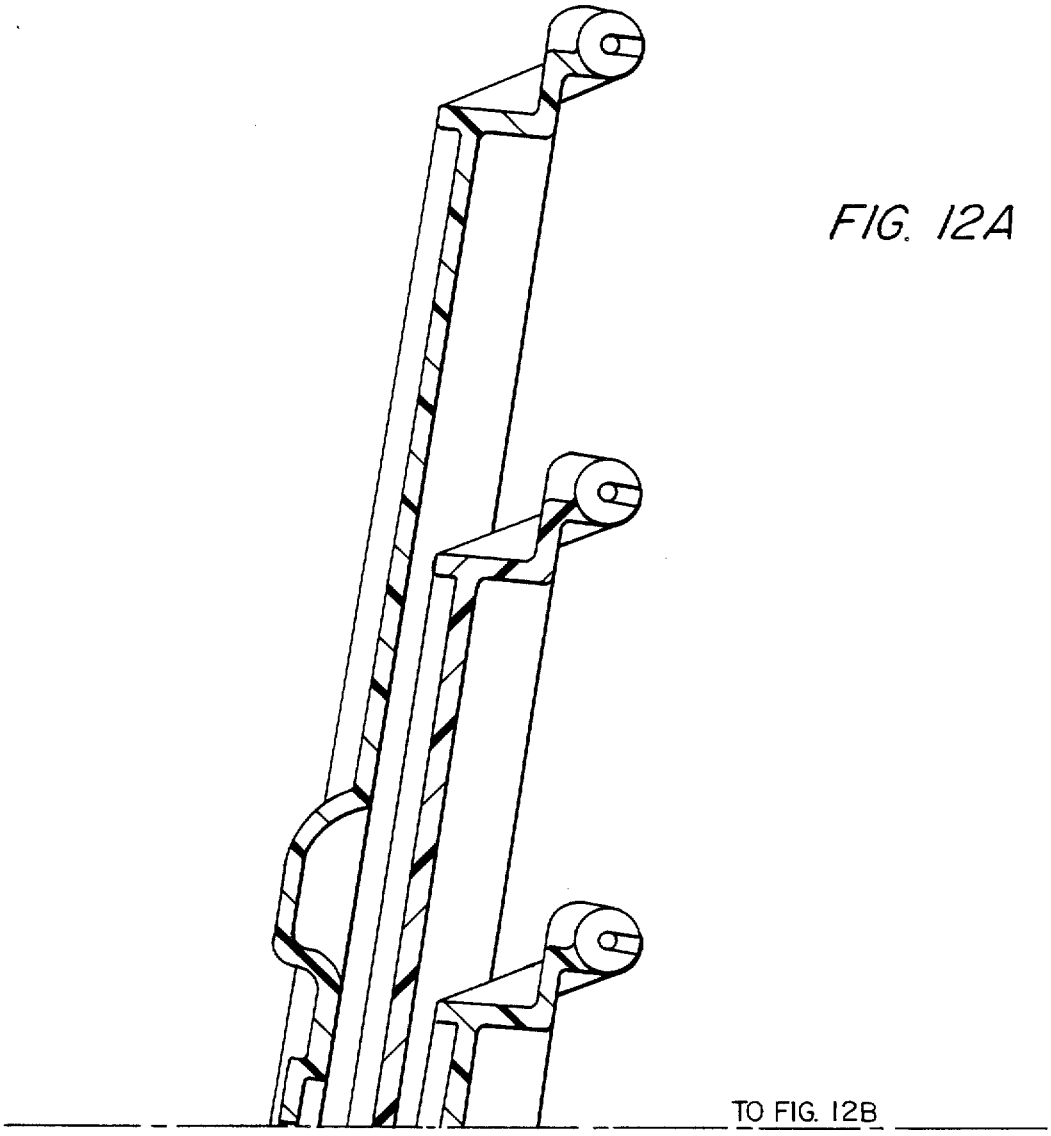
FIGS. 12A and 12B are together a cross-sectional view similar to FIGS. 9A and 9B, of the assignee's box 09-500, designated in 1973 and not employing the main features of the present invention.
Figure 12B:
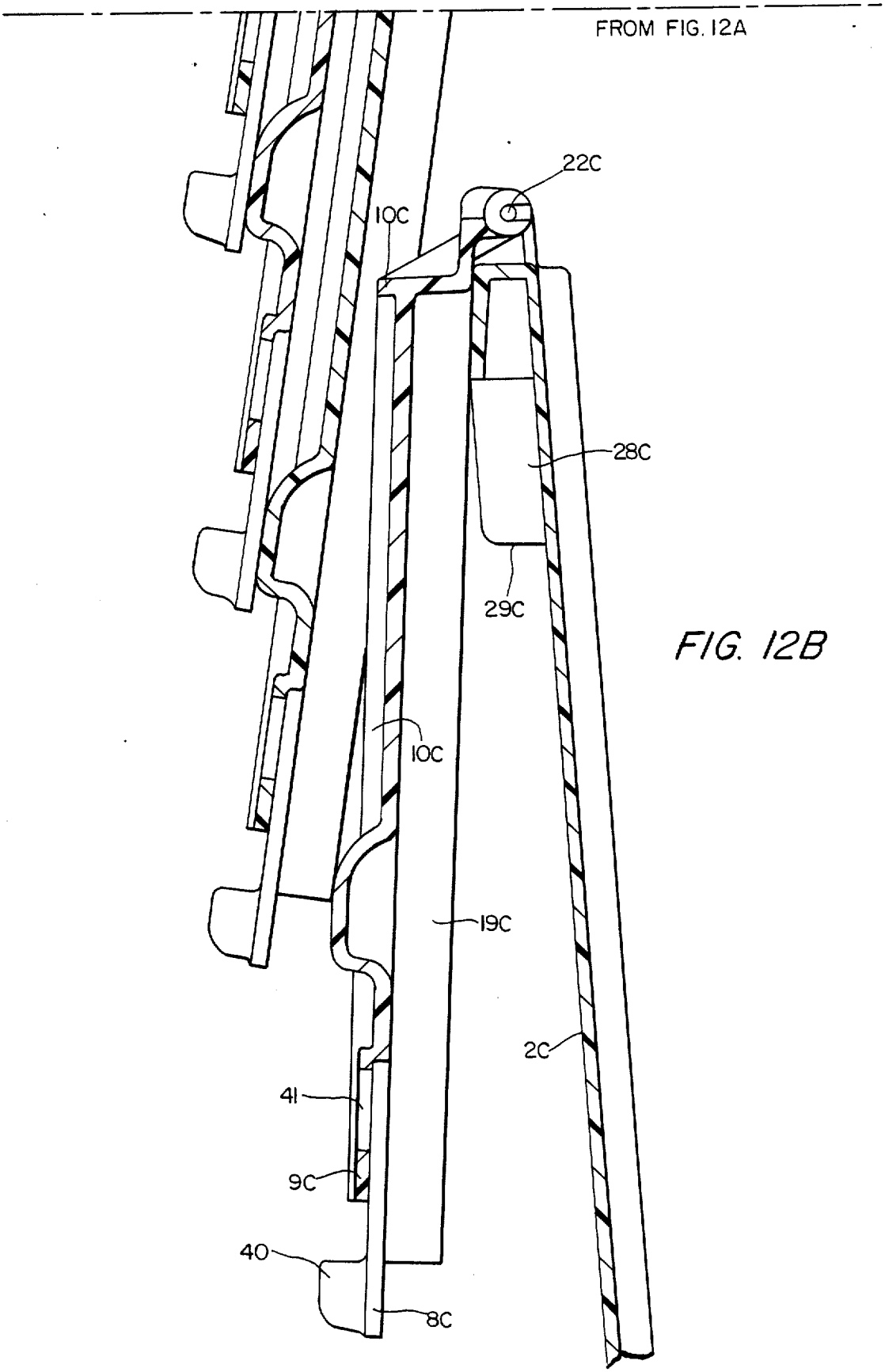
Figure 13A:
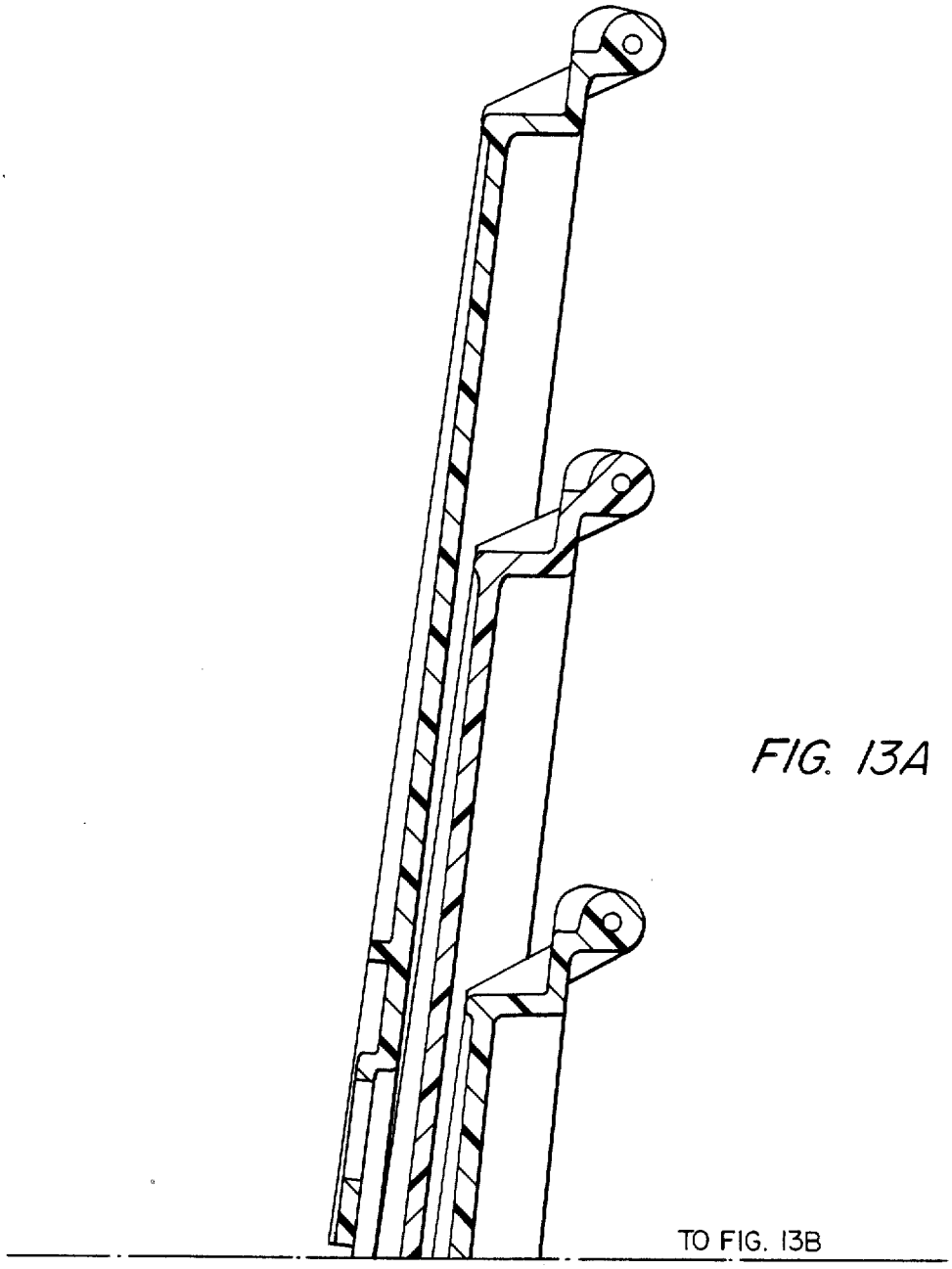
FIGS. 13A and 13B are together a cross-sectional view similar to FIGS. 12A and 12B, of the same tote box, but employing the three main features of the present invention to reduce lid flare.
Figure 13B:
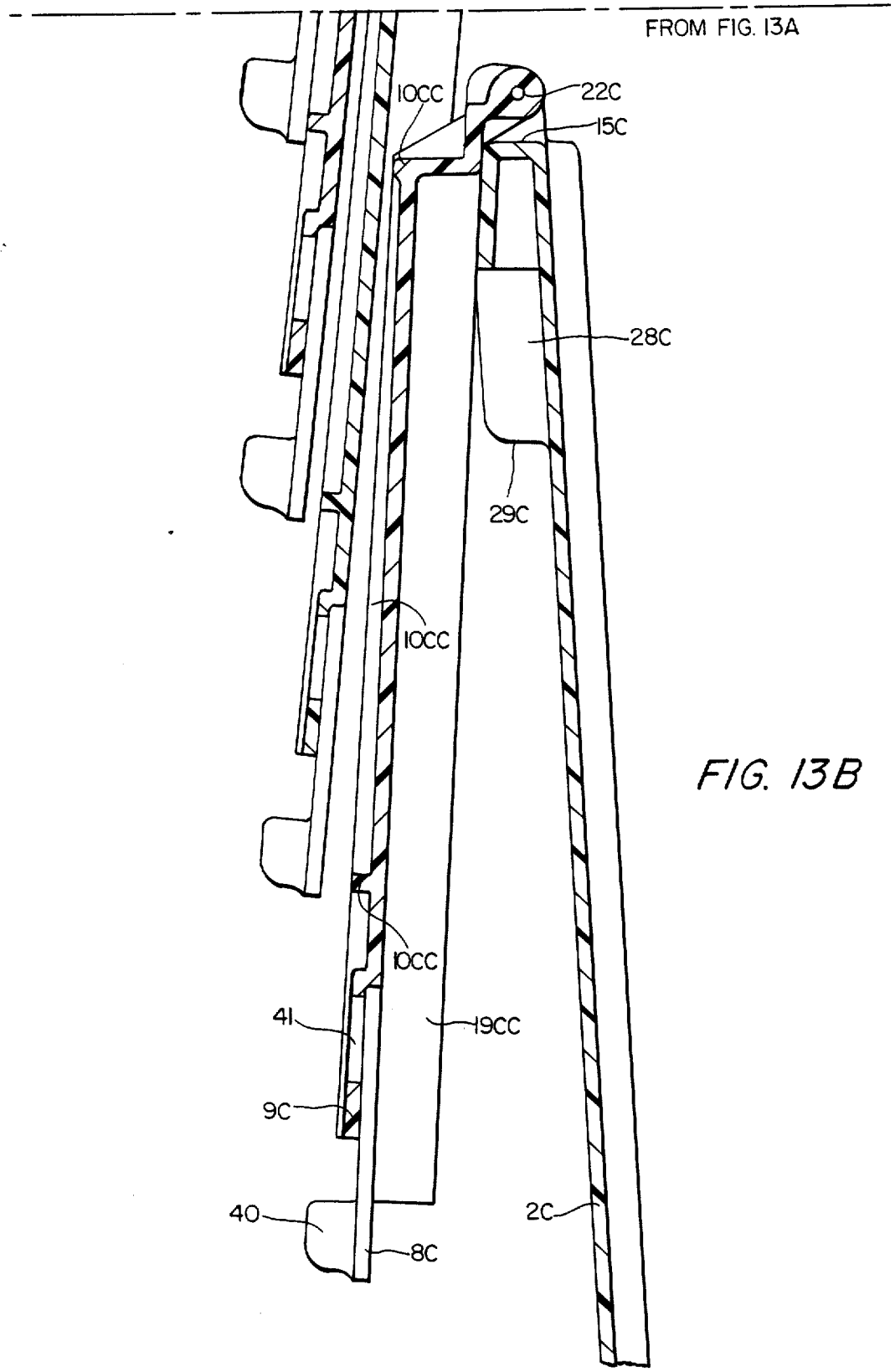

In the remaining embodiments, corresponding numerals have been applied to corresponding parts, and some structure obviously similar has not been numbered. In the embodiment of FIGS. 12 and 13, the rib and rib gap interconnection for the raised and depressed areas of the preferred embodiment of FIGS. 2 and 3 has been replaced by a projection 40 from the raised area 8C that will engage within an aperture 41 of the depressed area 9C of the other lid, when the two lids are simultaneously closed to provide the above-mentioned function, that is, preventing lateral separation of the closed lids perpendicular to the hinge axes 22.

The only difference between the boxes shown in FIGS. 12 and 13 is that the structure of FIG. 13 has been modified according to the present invention to reduce lid flare, which reduction amounts to 22%. The only difference between the structures shown in FIGS. 2 and 3 is that in FIG. 3 the features of the present invention have been employed to reduce lid flare. Since prototypes for the box of FIGS. 3 have been constructed, it has been determined that if the features of the present invention were not employed, the lid flare would be increased 35% as shown in FIG. 2.

Figure 9A:
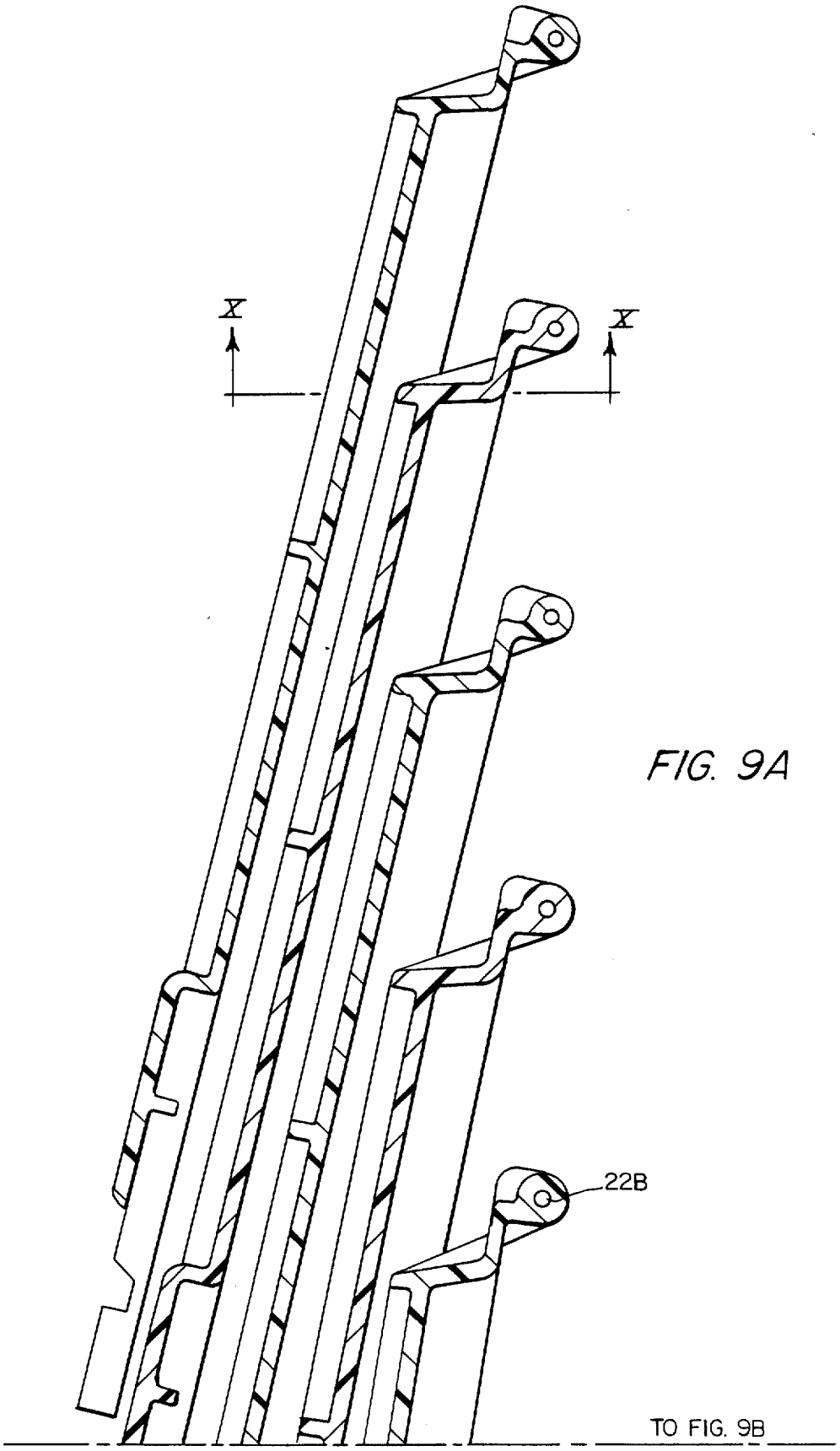
FIGS. 9A and 9B are together a view similar to FIG. 2, but of the assignee's tote box 09-590, designated in 1981.
Figure 9B:
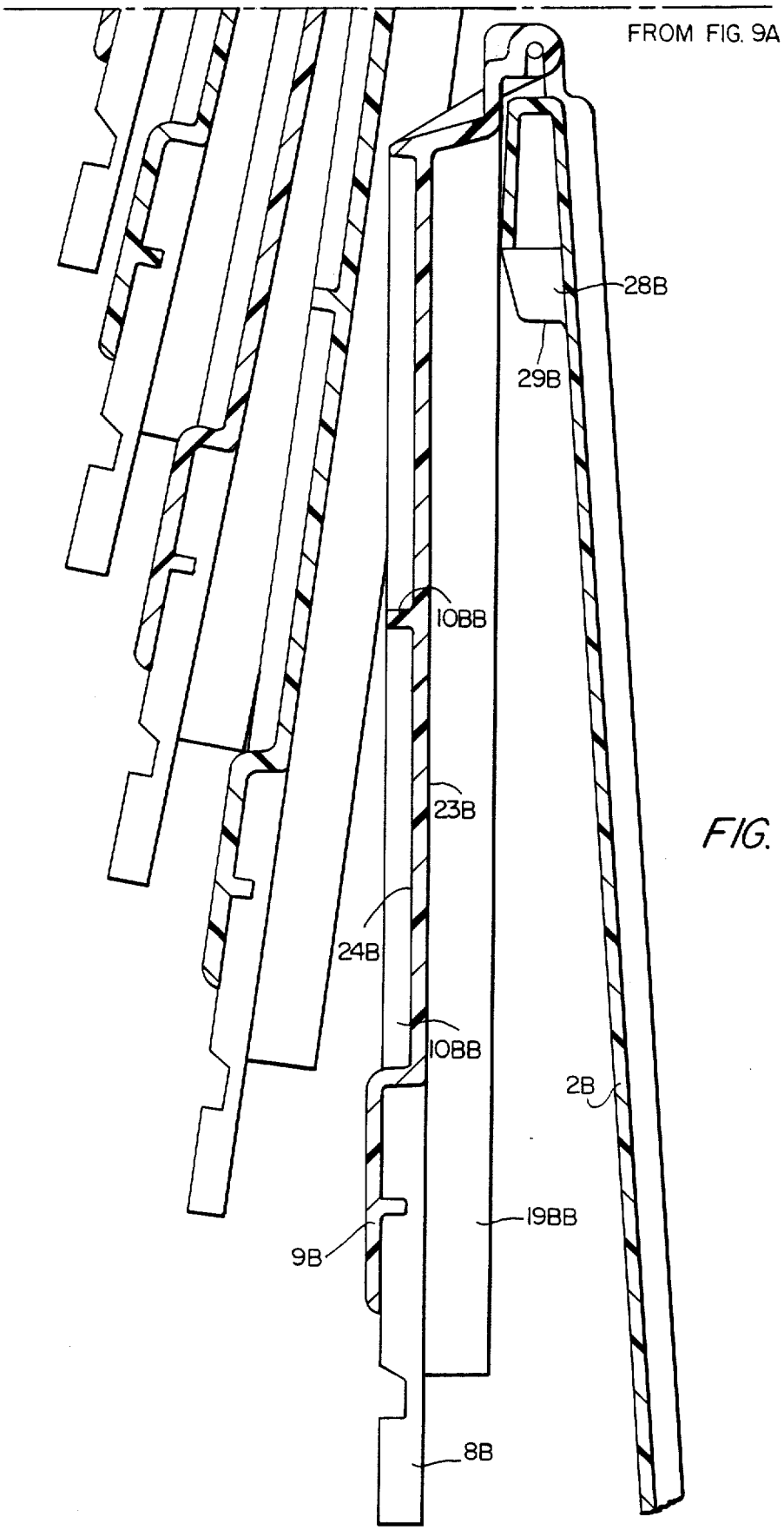
Figure 11A:
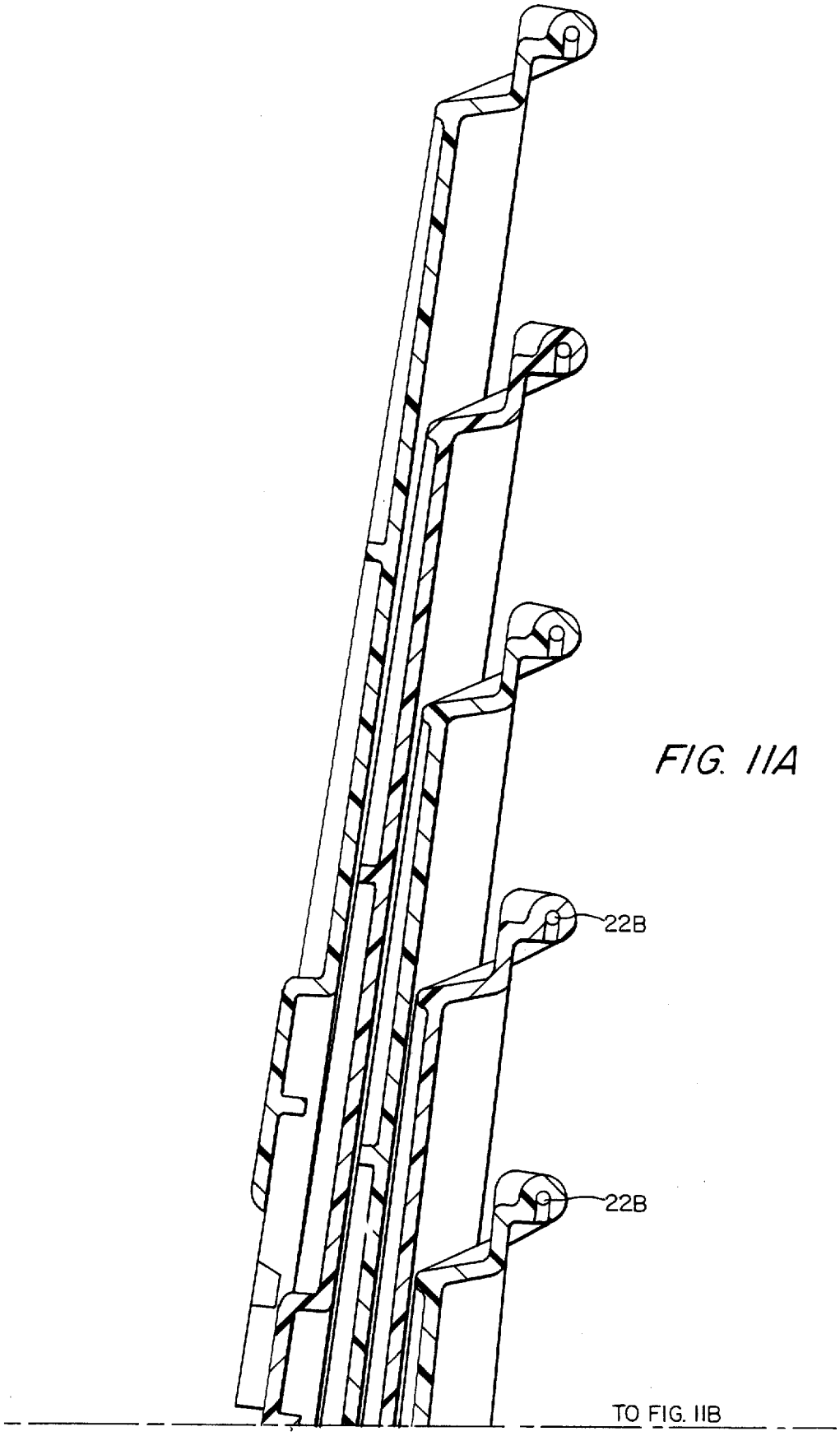
FIGS. 11A and 11B together are a cross-sectional view corresponding to FIGS. 9A and 9B, of the same tote box, but employing the three main features of the present invention to reduce lid flare.
Figure 11B:
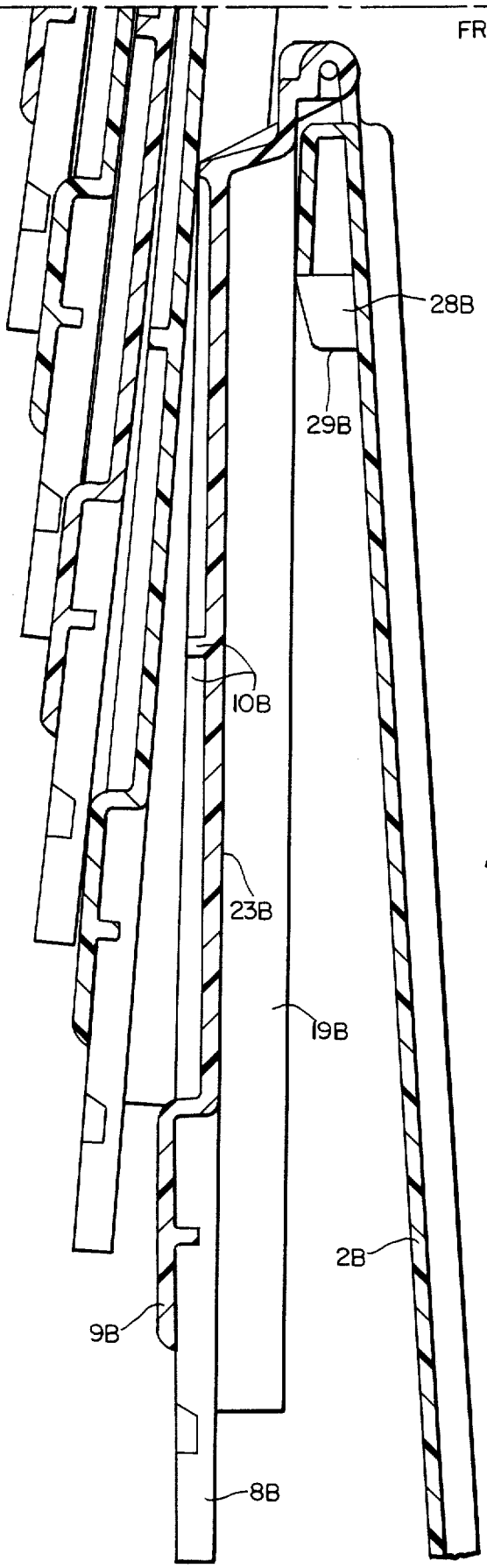

For the existing box structure of FIG. 9, the employment of the features of the present invention to reduce lid flare as shown in FIG. 11, which is the only difference between these figures, results in a reduction in lid flare of 35%. To a great extent, the amount of the nesting ratio determines the amount of lid flare and lid flare reduction.

Figure 5:
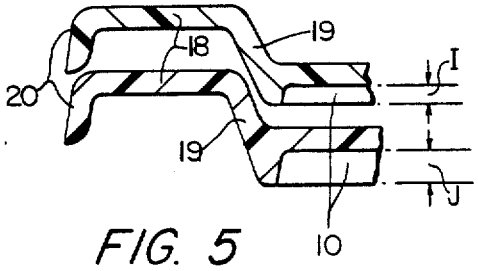
FIG. 5 is a partial cross-sectional view taken along line V—V in FIG. 3.
Figure 6:
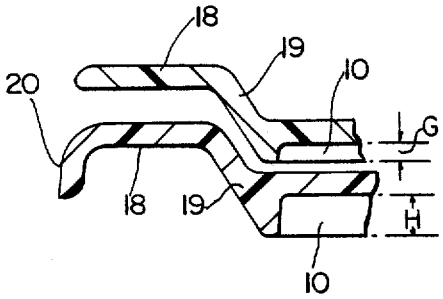
FIG. 6 is a partial cross-sectional view taken along line VI—VI in FIG. 3.
Figure 7:
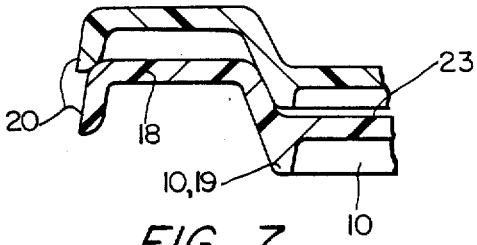
FIG. 7 is a partial cross-sectional view taken along line VII—VII in FIG. 3.

As mentioned above, lid flare is defined, at least in this application, as follows. In the nested position of the empty containers, the lids will be shingled as shown in the various figures. With the boxes resting upon a horizontal flat surface, the hinge axes 22 for a vertically adjacent lids will all lie in a vertical plane, referred to as the axis plane for the lids. If one takes the furthest point outward from the axis plane for the box structure without the lid, which with the illustrated embodiments would be the outermost point of the buttress or nesting stop 28, a plane BB passing through such point would determine one limit for the lid flare and may be referred to as the lid flare inboard plane. As seen from the various figures, the lowermost lid in a shingled stack lies the closest to vertical, while the other lids, due to contact, are rotated outward therefrom. After a certain number of lids in the stack, counting from the bottom, the lids will assume a fixed position, relatively speaking. This number is as follows for the various boxes shown in the figures; FIG. 2, 4; FIG. 3, 4; FIG. 9, 5 or 6; FIG. 11, 6; FIG. 12, 4; FIG. 13, 4. In any case, the lid that is rotated outward the most due to such contact would have the outermost point for the shingled lids, and the vertical plane AA passing through such point would be referred to as the outermost lid flare plane. The distance between the innermost lid flare plane BB and the outermost lid flare plane AA wold be referred to as the amount of lid flare, which should be the same for each end of the box if two attached lids are used.

For the existing prototype box of the preferred embodiment shown in FIG. 3, the lid flare is 1.62 inches, whereas without the features of the present invention it is determined to be 2.19 inches as shown in FIG. 2. With the existing box structure shown in FIG. 9, the lid flare is 3.38 inches, whereas if such box structure is modified according to the teachings of the present invention, the lid flare is calculated to be 2.19 inches, with a reduction of 35% in lid flare. For the existing box structure shown in FIG. 12, the lid flare is 2.38 inches, whereas with the same box structure modified according to the teachings of the present invention as shown in FIG. 13, the lid flare is determined to be 1.86 inches, with a 22% reduction in lid flare. With the preferred embodiment of FIG. 3 not employing the features of the present invention as set forth in FIG. 2, the lid flare is increased 35%. In addition to lid flare being determined to a great extent by the amount of the nesting ratio, the lid flare of course is also determined in amount by the size of the boxes. The above-mentioned boxes that have been illustrated in the Figures represent a wide and commercial range of box sizes and nesting ratios, as well as different box structures.

To further appreciate the present invention, it would again be useful to consider the design criteria for a box, as they relate to the present invention. For a particular customer, there is the following typical situation. The customer has a desired transport volume, for example the interior of a truck. With boxes to be stacked or nested with one orientation in the truck, it may be considered that the width of the truck interior is the starting dimension to be considered for lid flare. Let this width be dimension x. The customer may have a general idea of box size and weight when loaded that would be convenient for handling or the like, which according to the transport size would mean that 9 boxes could be placed side by side across the width of the truck, so that each box can have only a miximum width of x/9. The boxes have their maximum width when they are empty, nested and have their lids open and shingled as shown in the various figures. With two lids for each box, it is seen that allowance must be made for lid flare on each side of the box, so that the maximum box width, without lids, would be x/9 minus 2 times the lid flare. The amount of room taken up by the side walls and side wall tapered to permit nesting has been refined considerbly over the years and is fairly fixed, so that now the interior of the box has been determined insofar as its width is concerned, and the interior width controls to a great extent the volume of the box and therefore how much the box may carry, which is critical to the customer. Therefore, it is seen that any reduction in lid flare amount is multiplied by 2 and may be applied to increase the interior width of the box and thereby increase the volume and holding capacity of the box. These are known design criteria and with respect to this specific type of box have been well known since the introduction of the Bockenstette box in 1968, and known for single lided for much longer, e.g. 1938. These boxes are widely used and sold in large volumes by many different companies, but the analysis set forth in regard to the description of the present invention and the features flowing therefrom, primarily three in number, leading towards the present invention have produced lid flare reductions of between 22% and 35% with actual commercial boxes.

By way of specific example, the box according to FIGS. 2 and 3 have an overall height of 9 inches, interior height of 7.86 inches, general interior width of 7.64 inches, as measured parallel to the hinges and 6.63 inches as measured perpendicular to the hinges at the bottom. The maximum horizontal dimension of the box with the lids closed is 8.56 inches perpendicular to the hinges and 9.75 inches parallel to the hinges. The dimension perpendicular to the hinges increases to a maximum size of 10.12 inches with both lids open with respect to the bottom box. For the preferred embodiment as mentioned above, the features in the present invention can reduce lid flare from 2.19 inches to 1.62 inches or 0.57 inches for each side, which would be 1.14 inches per box therefore available according to the present invention to be applied to the interior volume. The interior dimension for the bottom of the box employing the features of the present invention is 6.63 inches, and it therefore can be seen that if the features of the present invention were not employed this dimension would be reduced by the above-mentioned 1.14 inches, or would become 5.49 inches, which is a considerable loss in usable space. Or alternatively viewed, the present invention provides a considerable gain in usable interior space for each box. When it is considered that one customer employs thousand of such boxes usually for the daily distribution of goods, such a saving of space becomes very considerable with respect to corresponding savings in handling, fuel, transports, shipping time, storage space, available inventory, and the like.

Figure 4:
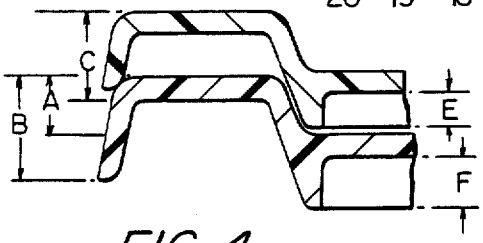
FIG. 4 is a partial cross-sectional view taken along line IV—IV in FIG. 3.
Figure 8:
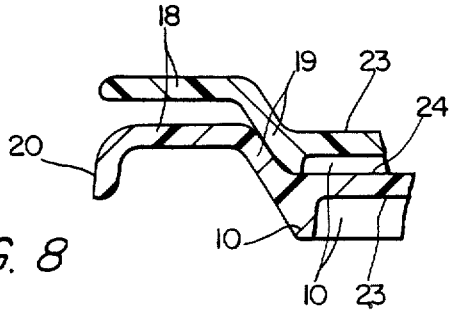
FIG. 8 is a partial cross-sectional view taken along line VIII—VIII in FIG. 3.

The variation in depth of the flange 20 and depth of the ribbing 10 can be particularly seen in the various cross-sectional views 4, 5, 6, 7 and 8. The angle of the flare for the flange 19 preferably remains the same for its entire length, but it is possible that it could change. It is seen, for example for a comparison of FIGS. 4 and 8, that reduction in rib depth and the depth of flange 20 (including its elimination) is necessary to permit the top surfaces 23 of adjacent lids to move closer towards each other, at any particular point. It can be seen from FIG. 8, that the optimum situation would be the elimination of the ribs 10 at this cross-section along with the elimination of the flange 20, for the inside of the two illustrated lids so that the bottom surface 24 of the inside lid would contact the top surface 23 of the outside lid (in FIG. 8, the outside lid, as in all the other Figures, is the lower of the illustrated lids). The structure according to FIG. 8 closely approximates this by providing a minimal ribbing 10 and small spacing between the surfaces 24, 23. This determines the angle of the lid that is second from the bottom, with the bottom lid hanging down approximately vertically; it is seen that this difference in angles permits the ribbing of the bottom one of the two lids to increase towards its terminal end, and likewise permits the flange 20 to increase to the same extent. The reason the optimum contact between the surface 24 of the outside and surface 23 of the inside lids is not achieved, is because that desite the flare for the flange 19, the thickness of the walls is such that full nesting cannot be achieved for the lids at this cross-section, or any other cross-section for that matter but perhaps it could be achieved for a box without the inboard flange, e.g., the Frater patent box. The remaining cross-sectional views can be analyzed in a similar manner.

While the present invention has been specifically described with respect to three embodiments, each with variations employable with the others and modifications, for the specific features of the present invention, they also indicate a breadth for the broader aspects of the present invention, so that the present invention includes both the specific elements and further embodiments, modifications and variations not disclosed, all within the spirit and scope of the following claims.

We claim:

1. A tote box, comprising:

a container having a rectangular bottom, and two pair of opposed side and end walls serially connected to each other around the periphery of said bottom to extend upwardly and outwardly so that a plurality of like containers may be nested therein and so that the nested height of any two containers is less than the height of two containers;

a lid overlying the top periphery of said container in a closed position to at least partially close the top of said container;

hinge means hingedly connecting said lid to one of said opposed end walls so that said lid may be rotated from the closed position approximately 270 degrees to an open position, in which said lid has a shingled orientation with respect to lids of adjacent nested tote boxes in their open position;

said lid having a generally planar body portion that is horizontal in the closed position;

said lid further having a peripheral flange structure including an inboard flange portion extending upwardly from the side edge of said body portion along the inside of said container side walls to an upper edge, a horizontal flange portion extending outwardly from said upper edge and overlying the top edge of said container side walls in the closed position of the lid, and an outboard flange portion extending downwardly from the outer edge of said horizontal flange to overlap said container side walls; and said flange structure further including said outboard flange portion having a variation in depth as measured generally perpendicular to said body portion and said inboard flange portion being flared downwardly from said horizontal flange portion and inwardly toward said body portion such that said flange structure of a first said tote box lid nests within the flange structure of a lid of a second adjacent and nested tote box when said lids of said first and said second tote boxes are in said open position and in said shingled orientation with respect to one another.

2. A tote box according to claim 1, further comprising:

said lid having a projecting structure extending generally perpendicularly from said body portion toward the inside of said container in said closed position, said projecting structure generally decreasing in dimension as measured perpendicular to said body in the direction toward said hinge means for reducing the lid flare of lids in said shingled orientation.

3. The tote box according to claim 2, wherein said outboard flange tapers in depth in the direction toward said hinge means.

4. The tote box according to claim 3, wherein said outboard flange tapers in depth and said projecting structure decreases in dimension generally uniformly in length and at the same angle with respect to said body.

5. The tote box according to claim 4, wherein said angle is greater than 9°.

6. The tote box according to claim 1, wherein said outboard flange tapers in depth uniformly in the direction toward said hinge means.

7. The tote box according to claim 4, wherein said projecting structure includes a plurality of reinforcing ribs.

8. A molded plastic tote box, comprising:

a container having a rectangular bottom, and two pair of opposed side and end walls serially connected to each other around the periphery of said bottom to extend upwardly and outwardly so that a plurality of like containers may be nested therein and so that the nested height of any two containers is less than that height of two containers;

a pair of lids overlying the top periphery of said container in a closed position to close the top of said container;

hinge means for each said lid hingedly connecting each said lid to one of said opposed end walls respectively so that said lids may be rotated from the closed position approximately 270 degrees to an open position in which each of said lids has a shingled orientation with respect to lids of adjacent nested tote boxes;

each of said lids having a generally planar body portion that is horizontal in the closed position;

each of said lids having a peripheral flange structure including an inboard flange portion extending upwardly from the side edge of said body portion along the inside of said container side walls to an upper edge, a horizontal flange portion extending outwardly from said upper edge and overlying the top edge of said container side walls in the closed position of the lid, and an outboard flange portion extending downwardly from the outer edge of said horizontal flange to overlap said container side walls; and said flange structure further including said outboard flange portion having a variation in depth as measured generally perpendicularly to said body portion and said inboard flange portion being flared downwardly from said horizontal flange portion and inwardly toward said body portion such that each said flange structure of a first said tote box lid nests within the flange structure of a second, adjacent and nested tote box lid when said lids of said first and said second tote boxes are in said open position and in said shingled orientation with respect to one another.

9. The tote box according to claim 8, further comprising:

said lid having a projecting structure extending generally perpendicular from said body portion toward the inside of said container in said closed position, said projecting structure generally decreasing in dimension as measured perpendicularly to said body portion in the direction toward said hinge means for reducing the lid flare of lids in said shingled orientation.

10. The tote box according to claim 9, wherein said outboard flange tapers in depth in the direction toward said hinge means.

11. The tote box according to claim 10, wherein said outboard flange tapers in depth and said projecting structure decreases in dimension generally uniform in length and at the same angle with respect to said body.

12. The tote box according to claim 11, wherein said angle is greater than 9 degrees.

13. The tote box according to claim 1, wherein said projecting structure includes a plurality of reinforcing ribs.

*14. A molded plastic tote box, comprising:*

*a container having a rectangular bottom, and two pair of opposed side and end walls serially connected to each other around the periphery of said bottom to extend upwardly and outwardly so that a plurality of like containers may be nested therein and so that the nested height of any two containers is less than the height of two containers;*

*a lid overlapping the top periphery of said container in a closed position to at least partially close the top of said container;*

*hinge means for said lid hingedly connecting said lid to one of said opposed end walls respectively so that said lid may be rotated from the closed position approximately 270 degrees to an open position in which said lid has a shingled orientation and contact with respect to lids of adjacent nested tote boxes;*

*said lid having a generally planar body portion than is horizontal in the closed position;*

*said lid having a peripheral flange structure including an inboard flange portion extending upwardly from the side edge of said body portion along the inside of said container side walls to an upper edge in the closed position, a horizontal flange portion extending outwardly from said upper edge and overlapping the top edge of said container side walls in the closed position of the lid, and an outboard flange portion extending downwardly from the outer edge of said horizontal flange to overlap said container side walls in the closed position; and*

*said flange structure further having reduced projecting structure in the area of the contact including said outboard flange portion having a variation in depth as measured generally perpendicular to said body portion that generally decreases in depth in the area of the contact where it is most closely adjacent the flange structure of the adjacent shingled lid of the next higher nested box for reducing interference therebetween, and including said inboard flange having reduced interfering structure adjacent said side•edge in the area of said contact, so that the interfering flange structure generally decreases so that the lid flare of the shingle lid is substantially less than it would be if the projecting structure did not decrease.*

*15. A tote box according to claim 14, wherein said outboard flange generally tapers in depth in the direction toward said hinge means.*

*16. A tote box according to claim 14, wherein said inboard flange includes a rib depending downwardly adjacent said main body side edge portion to a lower terminal edge, when viewed in the closed position.*

*17. A tote box according to claim 16, wherein said rib lower terminal edge is offset horizontally inwardly from the innermost portion of said inboard flange that is horizontally aligned with said horizontal flange portion for reduction of interfering structure.*

*18. A tote box according to claim 17, wherein said outboard flange generally tapers in depth in the directional toward said hinge means.*

*19. A tote box according to claim 17, wherein said rib lower terminal edge generally decreases in depth from its area remote from said hinge means toward and in the area of said contact.*

*20. A tote box according to claim 19, wherein said outboard flange generally tapers in depth in the direction toward said hinge means.*

*21. A tote box according to claim 17, wherein said inboard flange is tapered inwardly and downwardly gener-*

*ally smoothly for its entire depth to said rib lower terminal edge an amount sufficient to nest with the inboard flange of an adjacent lid of shingled lids attached to the nested boxes.*

*22. A tote box according to claim 21, wherein said outboard flange generally tapers in depth in the direction toward said hinge means.*

*23. A tote box according to claim 21, wherein said rib lower terminal edge generally decreases in depth from its area remote from said hinge means toward and in the area of said contact.*

*24. A tote box according to claim 23, wherein said outboard flange generally tapers in depth in the direction toward said hinge means.*

*25. A tote box according to claim 17, wherein said rib lower terminal edge is sufficiently horizontally inwardly offset with respect to the uppermost portion of the inboard flange portion and horizontal flange portion that the inboard flange of an adjacent nested box lid will nest within said rib lower terminal edge.*

*26. A tote box according to claim 25, wherein said outboard flange generally tapers in depth in the direction toward said hinge means.*

*27. A tote box according to claim 26, wherein said rib lower terminal edge generally decreases in depth from its area remote from said hinge means toward and in the area of said contact.*

*28. A tote box according to claim 27, wherein said inboard flange is tapered inwardly and downwardly generally smoothly for its entire depth to said rib lower terminal edge an amount sufficient to nest with the inboard flange of an adjacent lid of shingled lids attached to the nested boxes.*

*29. A tote box according to claim 26, wherein said inboard flange is tapered inwardly and downwardly generally smoothly for its entire depth to said rib lower terminal edge an amount sufficient to nest with the inboard flange of an adjacent lid of shingled lids attached to the nested boxes.*

*30. A tote box according to claim 25, wherein said rib lower terminal edge generally decreases in depth from its area remote from said hinge means toward and in the area of said contact.*

*31. A tote box according to claim 25, wherein said inboard flange is tapered inwardly and downwardly generally smoothly for its entire depth to said rib lower terminal edge an amount sufficient to nest with the inboard flange of an adjacent lid of shingled lids attached to the nested boxes.*

*32. A tote box according to claim 31, wherein said rib lower terminal edge generally decreases in depth from its area remote from said hinge means toward and in the area of said contact.*

*33. A tote box according to claim 16, further including a plurality of ribs generally extending in a grid to depend from the bottom of said body portion, generally throughout the extent of said body portion, and said additional ribs generally decreasing in depth toward said hinge means for reducing interfering structure of shingled lids of nested boxes.*

*34. A tote box according to claim 33, wherein said outboard flange generally tapers in depth in the direction toward said hinge means.*

*35. A tote box according to claim 34, wherein said rib lower terminal edge is offset horizontally inwardly from the innermost portion of said inboard flange that is horizontally aligned with said horizontal flange portion for reduction of interfering structure; and*

*said rib lower terminal edge is sufficiently horizontally inwardly offset with respect to the uppermost position of the inboard flange portion and horizontal flange portion that the inboard flange of an adjacent nested box lid will nest within said rib lower terminal edge.*

*36. A tote box according to claim 35, wherein said inboard flange is tapered inwardly and downwardly generally smoothly for its entire depth to said rib lower terminal edge an amount sufficient to nest with the inboard flange of an adjacent lid of shingled lids attached to the nested boxes.*

*37. A tote box according to claim 36, wherein said rib lower terminal edge generally decreases in depth from its area remote from said hinge means toward and in the area of said contact.*

*38. A tote box according to claim 33, wherein said rib lower terminal edge is offset horizontally inwardly from the innermost portion of said inboard flange that is horizontally aligned with said horizontal flange portion for reduction of interfering structure; and*

*said rib lower terminal edge is sufficiently horizontally inwardly offset with respect to the uppermost portion of the inboard flange portion and horizontal flange portion that the inboard flange of an adjacent nested box lid will nest within said rib lower terminal edge.*

*39. A tote box according to claim 38, wherein said inboard flange is tapered inwardly and downwardly generally smoothly for its entire depth to said rib lower terminal edge an amount sufficient to nest with the inboard flange of an adjacent lid of shingled lids attached to the nested boxes.*

*40. A tote box according to claim 39, wherein said rib lower terminal edge generally decreases in depth from its area remote from said hinge means toward and in the area of said contact.*

*41. A tote box according to claim 15, wherein said inboard flange includes a rib depending downwardly adjacent said main body side edge portion to a lower terminal edge, when viewed in the closed position; and*

*said rib lower terminal edge generally decreases in depth from its area remote from said hinge means toward and in the area of said contact.*

*42. A tote box according to claim 41, further including a plurality of ribs generally extending in a grid to depend from the bottom of said body portion, generally throughout the extent of said body portion, and said additional ribs generally decreasing in depth toward said hinge means for reducing interfering structure of shingled lids of nested boxes.*

*43. A tote box, comprising:*

*a container having a rectangular bottom, and two pair of opposed side and end walls serially connected to each other around the periphery of said bottom to extend upwardly and outwardly so that a plurality of like containers may be nested therein and so that the nested height of any two containers is less than the height of two containers;*

*a lid overlying the top periphery of said container in a closed position to at least partially close the top of said container;*

*hinge means hingedly connecting said lid to one of said opposed end walls so that said lid may be rotated from the closed position approximately 270 degrees to an open position, in which said lid has a shingled orientation with respect to lids of adjacent nested tote boxes in their open position;*

*said lid having a generally planar body portion that is horizontal in the closed position;* said lid further having a peripheral flange structure including a horizontal flange portion having inner and outer edges and overlying the top edge of said container side walls in the closed position of the lid, an outboard flange portion extending downwardly from the outer edge of said horizontal flange portion to overlap said container side walls, and an inboard flange portion having a top edge joining the inner edge of said horizontal flange portion and extending downwardly from the top edge adjacent an inside portion of said container side walls to terminate in a bottom edge; and

*said flange structure further including said outboard flange portion having a variation in depth as measured generally perpendicular to said body portion and said bottom edge of said inboard flange portion being offset in a direction generally parallel to said body portion from said top edge such that when the lid of a first said tote box overlaps the lid of a second adjacent and nested said tote box when said lids of said first and second tote boxes are in said open position with said lids in said shingled orientation with respect to one another, said top edge of said inboard flange of said first tote box is misaligned with said bottom edge of said inboard flange of said second tote box in a direction perpendicular to said horizontal flange.*

*44. A tote box according to claim 43, wherein said inboard flange is flared downwardly and inwardly toward said body portion from said top edge to said bottom edge.*

*45. A tote box according to claim 43, further comprising:*

*said lid having at least one projecting rib extending generally perpendicular from said body portion and having a bottom portion in common with said bottom edge of said inboard flange, wherein said projecting rib generally decreases in a dimension measured perpendicularly to said body portion in the direction toward said hinge means.*

*46. A tote box according to claim 45, further comprising a plurality of said ribs projecting generally perpendicularly from said body portion, each of said ribs generally decreasing in a dimension perpendicular to the body portion to the same extent.*

*47. A tote box according to claim 45, wherein said inboard flange flares downwardly and inwardly toward said body portion from said top edge to said bottom edge.*

*48. A tote box according to claim 43, wherein said inboard flange portion includes a rib projecting downwardly from said body portion and adjacent said inside portion of said container side walls.*

*49. A tote box according to claim 47, wherein said rib has a bottom edge that is in common with said bottom edge of said inboard flange portion.*

*50. A tote box, comprising:*

*a container having a rectangular bottom, and two pair of opposed side and end walls serially connected to each other around the periphery of said bottom to extend upwardly and outwardly so that a plurality of like containers may be nested therein and so that the nested height of any two containers is less than the height of two containers;*

*a lid overlying the top periphery of said container in a closed position to at least partially close the top of said container;*

*hinge means hingedly connecting said lid to one of said opposed end walls so that said lid may be rotated from the closed position approximately 270 degrees to an open position, in which said lid has a shingled orientation with respect to lids of adjacent nested tote boxes in their open position;*

*said lid having a generally planar body portion that is horizontal in the closed position;*

*said lid further having a peripheral flange structure including a horizontal flange portion having inner and outer edges and overlying the top edge of said container side walls in the closed position of the lid, an outboard flange portion extending downwardly from the outer edge of said horizontal flange portion to overlap said container side walls, and an inboard flange portion having a top edge joining the inner edge of said horizontal flange portion to extend downwardly therefrom, and said inboard flange portion including a projecting rib portion extending downwardly from said body portion to a rib bottom edge; and*

*said flange structure further including said outboard flange portion having a variation in depth as measured generally perpendicular to said body portion, and said inboard flange portion rib bottom edge being offset in a direction generally parallel with said body portion with respect to said top edge of said inboard flange portion such that when the lid of a first said tote box overlaps the lid of a second adjacent and nested said tote box when said lids of said first and second tote boxes are in said open position with said lids in said shingled orientation with respect to one another, said top edge of said inboard flange of said first tote box is misaligned with said rib bottom edge of said second tote box in a direction perpendicular to said horizontal flange.*

*51. A tote box according to claim 50, wherein said inboard flange is flared downwardly and inwardly from said top edge to said rib bottom edge.*

*52. A tote box according to claim 50, wherein said rib portion generally decreases in a dimension measured perpendicularly to said body portion in the direction toward said hinge means.*

*53. A tote box according to claim 50, further comprising a plurality of ribs projecting downwardly from said body portion, each of said ribs generally decreasing in a dimension measured perpendicularly to said body portion in a direction toward said hinge means.*

*54. A tote box according to claim 53, wherein said rib portion of said inboard flange decreases in a dimension measured perpendicularly to said body portion in a direction toward said hinge means.*

*55. A tote box according to claim 52, further comprising a plurality of ribs projecting downwardly from said body portion, each of said ribs generally decreasing in a dimension measured perpendicularly to said body portion in a direction toward said hinge means and to the same extent as said decreasing dimension of said inboard flange rib portion.*

* * * * *